No. 737,613. PATENTED SEPT. 1, 1903.
H. HALSEY.
ELECTRIC BATTERY.
APPLICATION FILED DEC. 6, 1902.
NO MODEL.
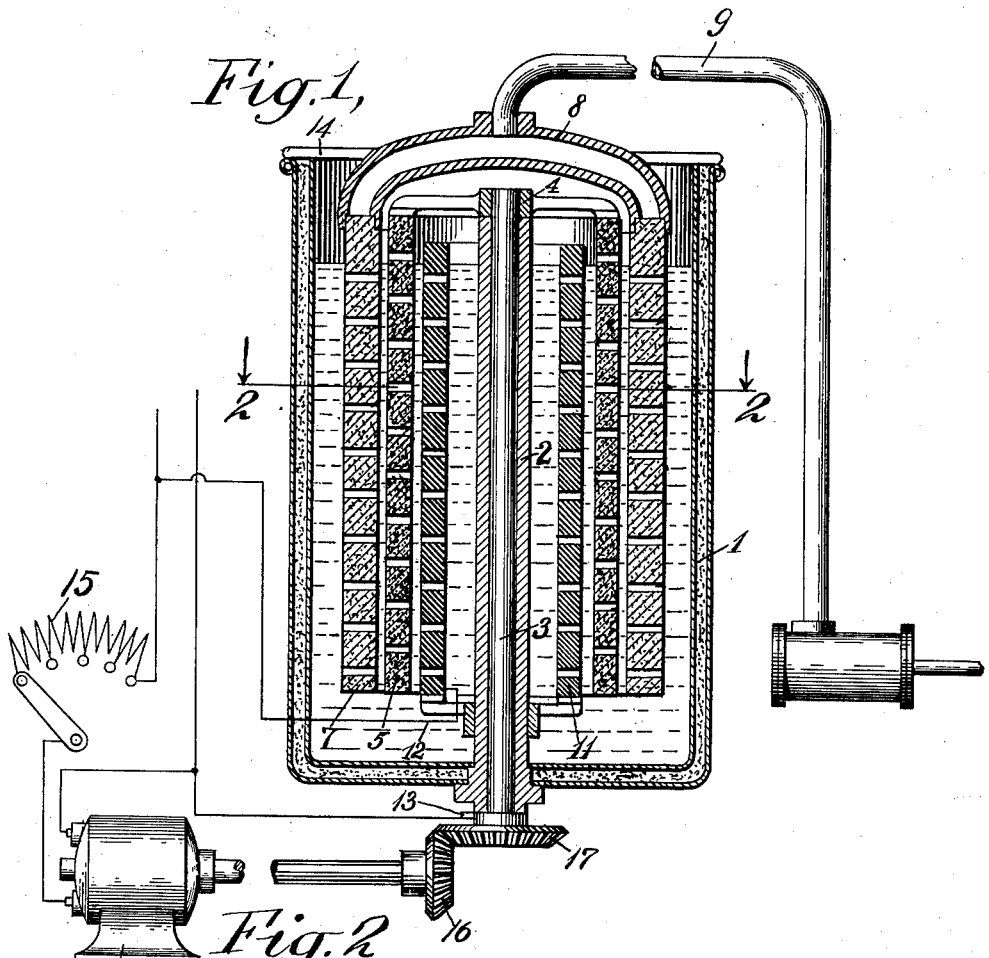
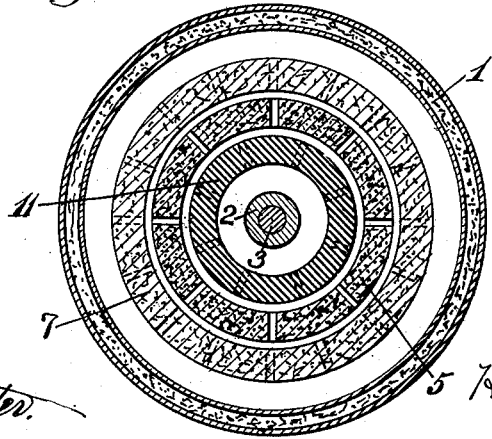
WITNESSES:
Julian T. Wooster.
Lester C. Taylor.
INVENTOR
Henry Halsey
BY
C. N. Edwards
ATTORNEY No. 737,613. Patented September 1, 1903.

UNITED STATES PATENT OFFICE.

HENRY HALSEY, OF NEW YORK, N. Y., ASSIGNOR, BY MESNE ASSIGNMENTS, TO HALSEY ELECTRIC GENERATOR COMPANY, OF JERSEY CITY, NEW JERSEY, A CORPORATION OF NEW JERSEY.

ELECTRIC BATTERY.

SPECIFICATION forming part of Letters Patent No. 737,613, dated September 1, 1903.

Application filed December 6, 1902. Serial No. 134,147. (No model.)

*To all whom it may concern:*

Be it known that I, HENRY HALSEY, a citizen of the United States, residing at New York, in the county of New York and State of New York, have invented certain new and useful Improvements in Electric Batteries, of which the following is a full, clear, and exact specification.

This invention relates to improvements in electric batteries, and especially to that class of batteries containing mechanical means to prevent polarization.

The object of this invention is to provide a battery of simple mechanical construction which shall be of increased electrical efficiency.

In batteries of this general class heretofore described by me one or more of the elements is movable in the electrolyte to prevent polarization. In the batteries heretofore known the gases were allowed to escape from the electrolyte into the atmosphere and necessarily against the atmospheric pressure. In my present improvement the cell is hermetically sealed and the gases are exhausted from the cell by an air-pump. By this arrangement the disengagement and removal of gases are facilitated, as there is not the atmospheric pressure to overcome.

In the drawings, Figure 1 is a longitudinal cross-sectional view, and Fig. 2 is a transverse section on the line 2 2 of Fig. 1.

1 is the casing containing the cell.

2 is a hollow sleeve attached to the casing and carrying the shaft 3. At the upper end of the shaft is the hanger 4, to which the element 5 is attached. The shaft is rotated by gearing 16 17 from a motor 6.

7 is a porous diaphragm of absorbent material outside of the movable element and attached to a hollow hanger connected by a pipe 9 with an air-pump 10, by which the gases as they are formed are drawn through the porous element and out through the hanger 8 and pipe 9.

The element 11 is carried on the sleeve 2 and may be electrically connected with the element 7 in any suitable manner, as by a wire 12. Connection with the other element is made through a brush on the shaft 3.

14 is a cover secured in any suitable manner, and 15 is a rheostat or other form of motor-controller.

The diaphragm is composed of any substance not affected by the electrolyte, such as asbestos, and has perforations to permit circulation of the electrolyte. By the use of a porous diaphragm in a partial vacuum the gases will be carried off more readily from the bottom, as they will be drawn into the interstices of the diaphragm and directly up through it by the exhaust, which will not be strong enough to draw up the liquid.

I consider it within the scope of my invention to exhaust the gases as they rise from above the liquid without the use of the porous diaphragm; but the construction I have illustrated is my preferred form.

I do not wish to be limited to the exact construction shown in the drawings, as my invention is applicable to many other forms of batteries than that I have shown.

Having thus described my invention, I declare that what I claim as new, and desire to secure by Letters Patent, is—

1. In a battery, the combination with the elements and a mechanical depolarizer, of means for exhausting the gases from the interior of the battery.

2. In a battery, a fixed element and a movable element, means for exhausting gases formed in the battery comprising a porous diaphragm and an air-pump connected with the diaphragm, substantially as described.

3. In a battery, the combination with a mechanical depolarizer and means for controlling it, of means for exhausting the gases formed in the battery.

In testimony whereof I affix my signature in presence of two witnesses.

HENRY HALSEY.

Witnesses:
JULIAN S. WOOSTER,
HENRY BEST.